(12) United States Patent
Xu (10) Patent No.: US 8,522,558 B1
(45) Date of Patent: Sep. 3, 2013

(54) MULTI-LOBED COOLING HOLE ARRAY

(75) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 12 days.

(21) Appl. No.: 13/544,112

(22) Filed: Jul. 9, 2012

Related U.S. Application Data (60) Provisional application No. 61/599,385, filed on Feb. 15, 2012.

(51) Int. Cl.
*F23R 3/00* (2006.01)

(52) U.S. Cl.
USPC .............. 60/752; 60/806; 415/115; 416/96 R (58) Field of Classification Search
USPC .................. 60/752–760, 806; 415/115–116; 416/96 A, 96 R, 97 A, 97 R
See application file for complete search history.

(56) References Cited

U.S. PATENT DOCUMENTS

| | | | |
|---|---|---|---|
| 4,197,443 A | 4/1980 | Sidenstick | |
| 4,529,358 A | 7/1985 | Papell | |
| 4,622,821 A | 11/1986 | Madden | |
| 4,653,279 A | 3/1987 | Reynolds | |
| 4,653,983 A | 3/1987 | Vehr | |
| 4,672,727 A | 6/1987 | Field | |
| 4,684,323 A | 8/1987 | Field | |
| 4,700,544 A | 10/1987 | Fucci | |
| 4,705,455 A * | 11/1987 | Sahm et al. | 416/97 R |
| 4,738,588 A | 4/1988 | Field | |
| 5,062,768 A | 11/1991 | Marriage | |
| 5,096,379 A | 3/1992 | Stroud et al. | |
| 5,129,231 A | 7/1992 | Becker et al. | |
| 5,252,026 A | 10/1993 | Shepherd | |
| 5,326,224 A | 7/1994 | Lee et al. | |
| 5,358,374 A | 10/1994 | Correia et al. | |
| 5,382,133 A | 1/1995 | Moore et al. | |
| 5,418,345 A | 5/1995 | Adamski | |
| 5,419,681 A | 5/1995 | Lee | |
| 5,609,779 A | 3/1997 | Crow et al. | |

(Continued)

FOREIGN PATENT DOCUMENTS

| EP | 1326007 A2 | 7/2003 |
|---|---|---|
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

*Primary Examiner* — Phutthiwat Wongwian
(74) *Attorney, Agent, or Firm* — Kinney & Lange, P.A.

(57) ABSTRACT

A gas turbine engine component includes a wall having first and second wall surfaces and first and second cooling holes extending through the wall. The first and second cooling holes each include an inlet located at the first wall surface, an outlet located at the second wall surface, a metering section extending downstream from the inlet and a diffusing section extending from the metering section to the outlet. Each diffusing section includes first and second lobes, each lobe diverging longitudinally and laterally from the metering section. The outlets of each cooling hole include first and second lateral ends and a trailing edge. One of the lateral ends of the outlet of the first cooling hole and one of the lateral ends of the outlet of the second cooling hole meet upstream of the trailing edge of the first cooling hole and the trailing edge of the second cooling hole.

20 Claims, 7 Drawing Sheets

(56) References Cited

U.S. PATENT DOCUMENTS

| | | |
|---|---|---|
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,246,992 B2 * | 7/2007 | Lee ............................ 415/115 |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,245,519 B1 * | 8/2012 | Liang .............................. 60/806 |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2005/0135931 A1 * | 6/2005 | Nakamata et al. .......... 416/97 R |
| 2008/0003096 A1 | 1/2008 | Kohli et al. |
| 2008/0145208 A1 | 6/2008 | Klasing et al. |
| 2009/0013695 A1 | 1/2009 | Dierberger et al. |
| 2009/0169394 A1 * | 7/2009 | Crow et al. ................. 416/96 R |
| 2009/0274549 A1 * | 11/2009 | Mitchell et al. ................ 415/115 |
| 2009/0304499 A1 | 12/2009 | Strock et al. |
| 2010/0068032 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |
| 2012/0167389 A1 | 7/2012 | Lacy et al. |

* cited by examiner

MULTI-LOBED COOLING HOLE ARRAY

CROSS-REFERENCE TO RELATED APPLICATION

This application claims priority to U.S. Provisional Application No. 61/599,385, filed on Feb. 15, 2012 and entitled "MULTI-LOBED COOLING HOLE ARRAY", the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes a wall having first and second wall surfaces and first and second cooling holes extending through the wall. The first and second cooling holes each include an inlet located at the first wall surface, an outlet located at the second wall surface, a metering section extending downstream from the inlet and a diffusing section extending from the metering section to the outlet. Each diffusing section includes first and second lobes, each lobe diverging longitudinally and laterally from the metering section. The outlets of each cooling hole include first and second lateral ends and a trailing edge. One of the lateral ends of the outlet of the first cooling hole and one of the lateral ends of the outlet of the second cooling hole meet upstream of the trailing edge of the first cooling hole and the trailing edge of the second cooling hole.

A gas path wall of a component of a gas turbine engine includes first and second wall surfaces, first and second inlets located at the first wall surface, and first and second outlets located at the second wall surface. A first metering section commences at the first inlet and extends downstream from the first inlet. A first diffusing section extends from the first metering section and terminates at the first outlet. The first diffusing section includes a first trailing edge and first and second lobes, each lobe diverging longitudinally and laterally from the first metering section. The second lobe includes a first lateral end surface. A second metering section commences at the second inlet and extends downstream from the second inlet. A second diffusing section extends from the second metering section and terminates at the second outlet. The second diffusing section includes a second trailing edge and third and fourth lobes, each lobe diverging longitudinally and laterally from the second metering section. The third lobe includes a second lateral end surface. The first lateral end surface of the second lobe and the second lateral end surface of the third lobe meet upstream of the first and second trailing edges.

A method for producing an array of multi-lobed cooling holes between first and second wall surfaces includes forming a first cooling hole and a second cooling hole. The first cooling hole includes an inlet located at the first wall surface, an outlet located at the second wall surface, a metering section commencing at the inlet and extending downstream from the inlet and a diffusing section extending from the metering section and terminating at the outlet. The diffusing section includes first and second lobes, each lobe diverging longitudinally and laterally from the metering section, and a trailing edge. The second cooling hole includes an inlet located at the first wall surface, an outlet located at the second wall surface, a metering section commencing at the inlet and extending downstream from the inlet and a diffusing section extending from the metering section and terminating at the outlet. The diffusing section includes first and second lobes, each lobe diverging longitudinally and laterally from the metering section, and a trailing edge. The second lobe of the first cooling hole and the first lobe of the second cooling hole meet upstream of the outlets of the first and second cooling holes.

DETAILED DESCRIPTION

Figure 1:
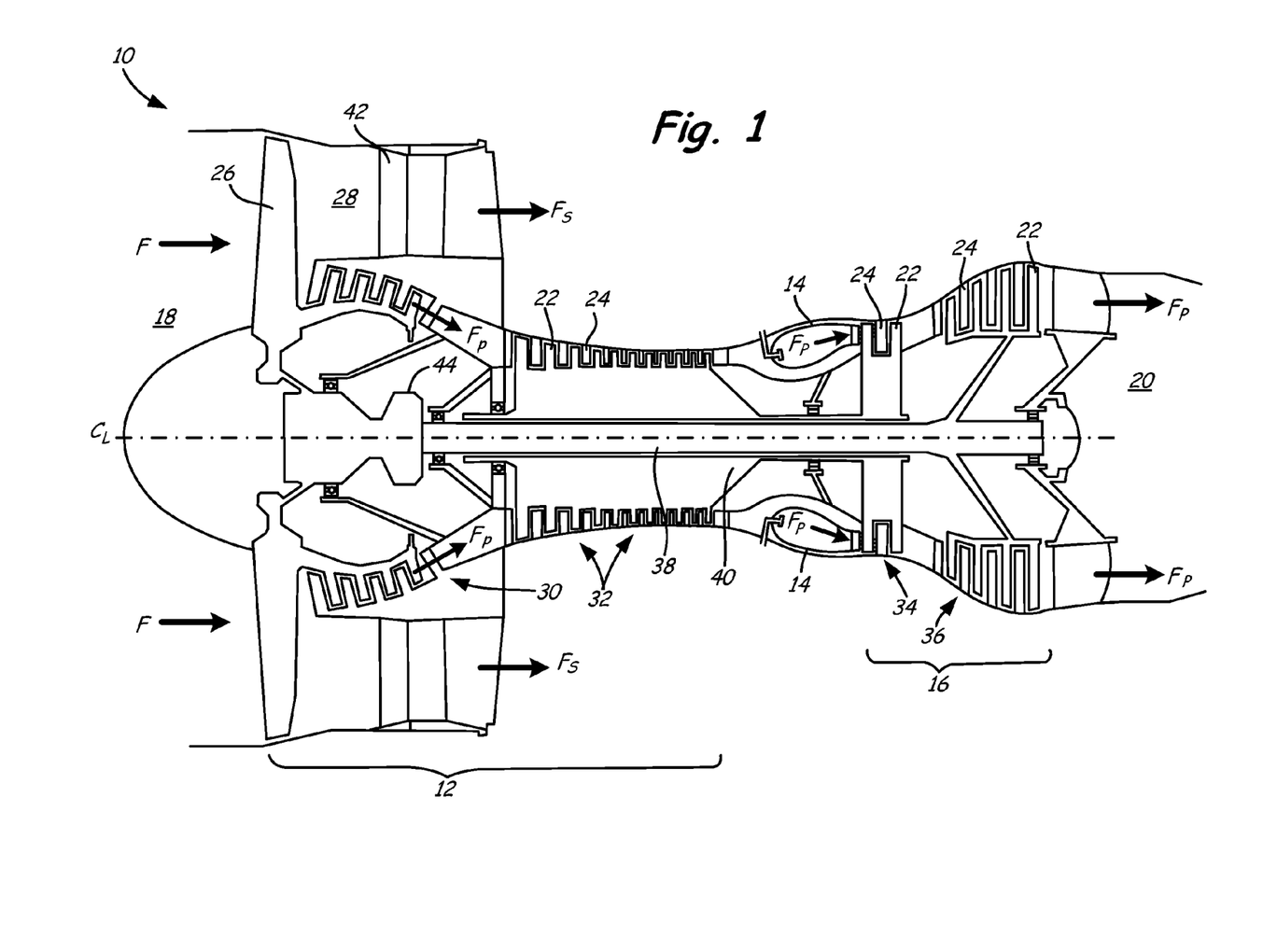
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
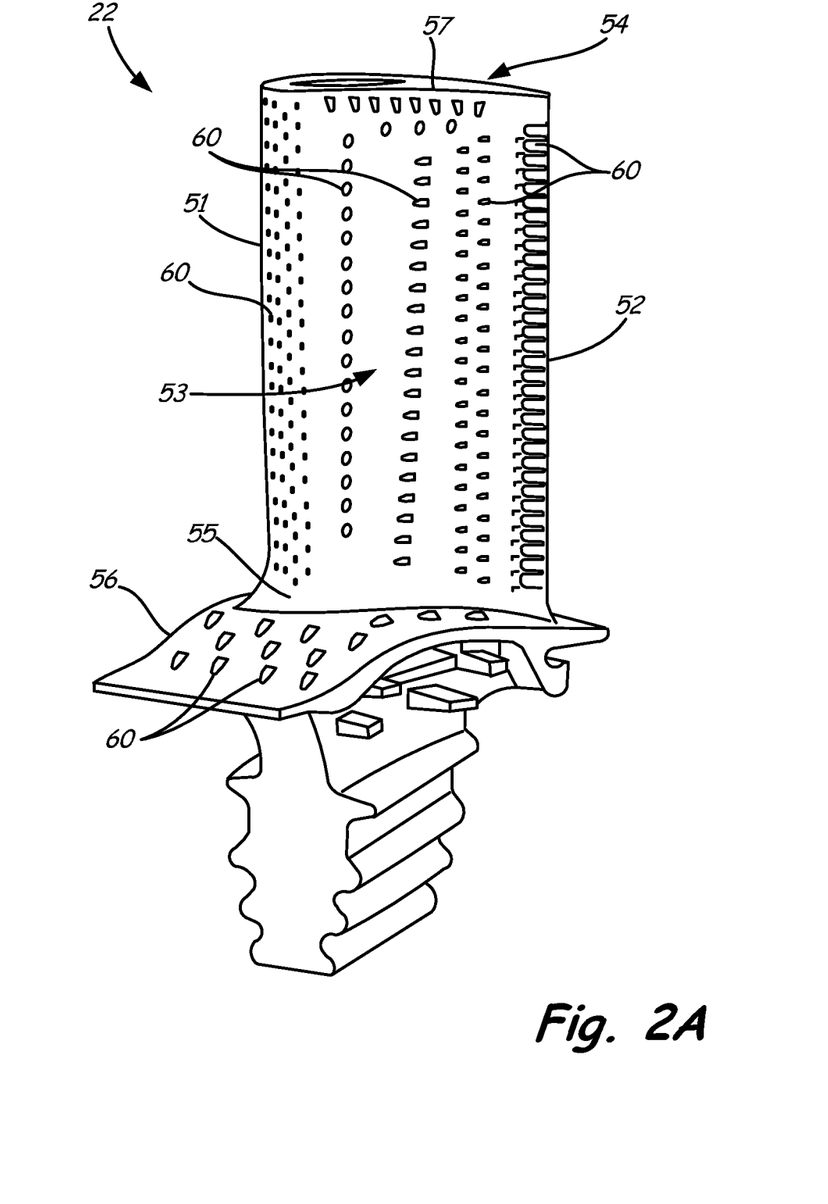
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
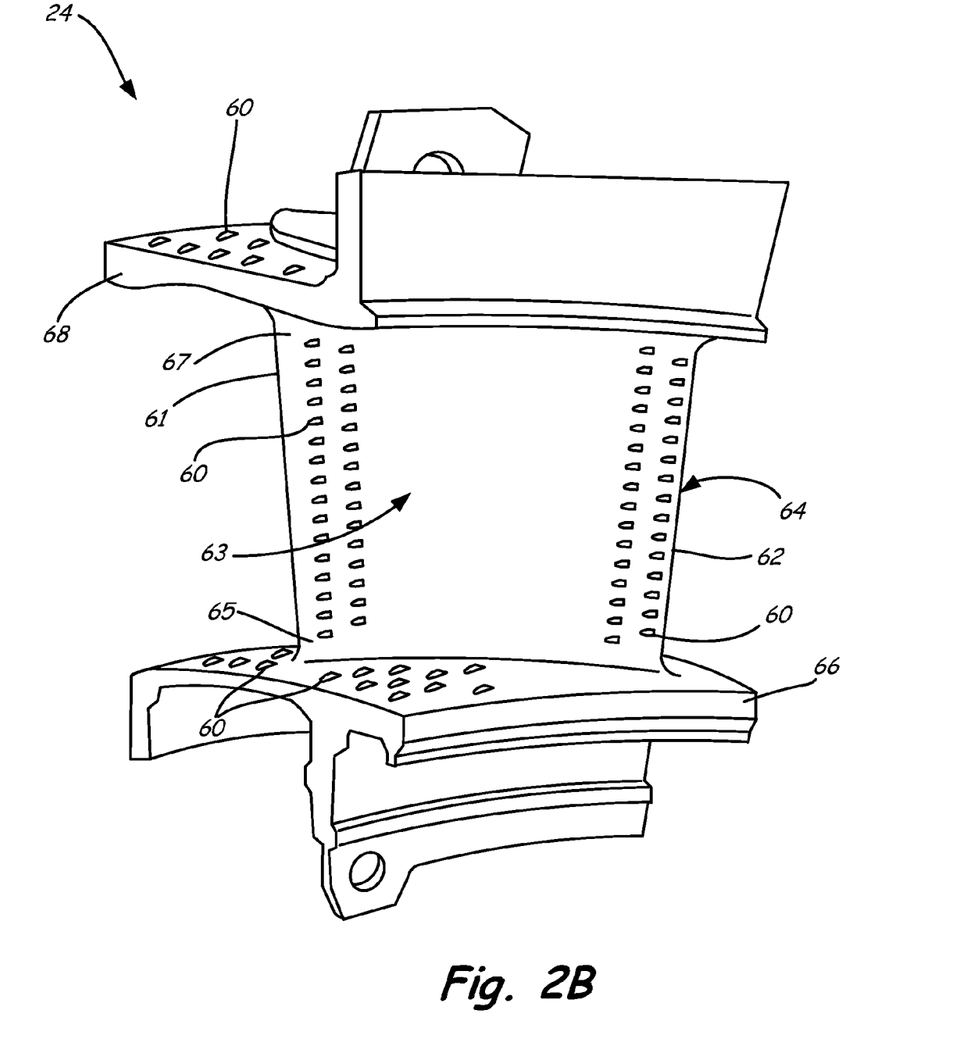
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The array of multi-lobed cooling holes described herein provide a cooling solution that offers improved lateral film cooling coverage and eliminates or reduces the problems associated with conventional diffusion film cooling holes, such as flow separation, blow off and low resistance to thermo-mechanical fatigue. Multi-lobed cooling holes provide improved film effectiveness and reduce the likelihood of film separation so that they work as intended at high blowing ratios and reduce the detrimental effects of kidney vortices. The array of cooling holes described herein also provide increased resistance to thermo-mechanical fatigue by eliminating "sharp" corners within the cooling holes.

Figure 3:
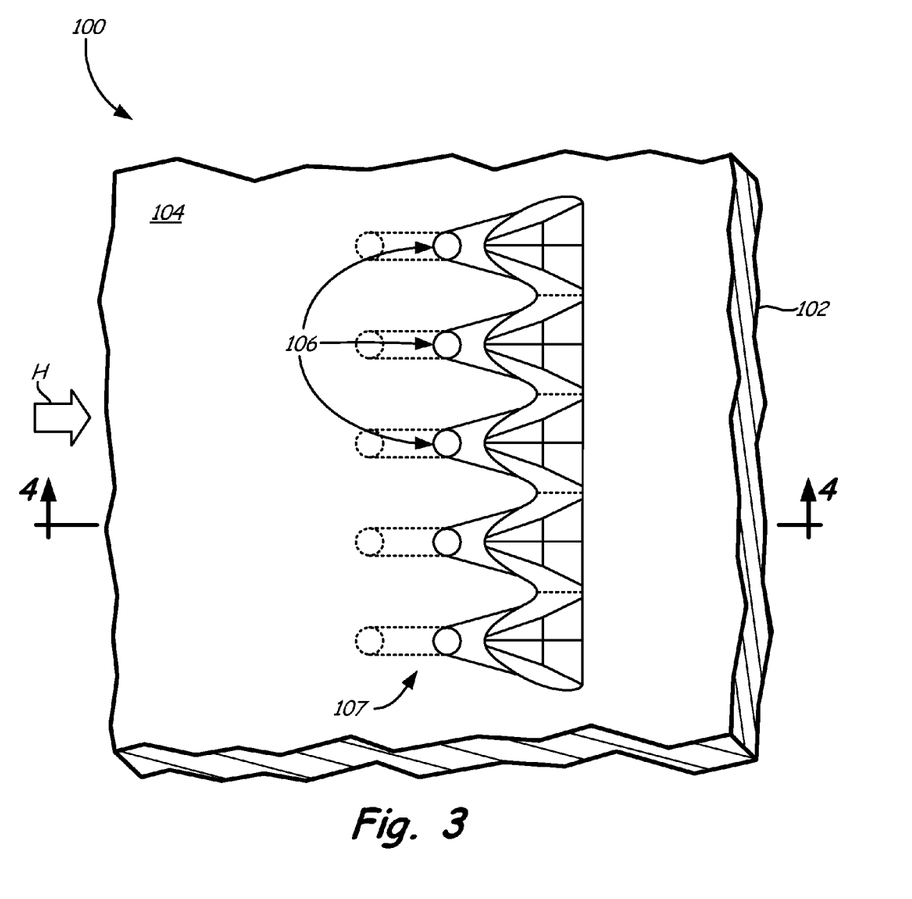
FIG. 3 is a view of a wall having an array of multi-lobed cooling holes.

FIG. 3 illustrates a view of a wall of a gas turbine engine component having an array of multi-lobed film cooling holes. Wall 100 includes first wall surface 102 and second wall surface 104. As described in greater detail below, wall 100 is primarily metallic and second wall surface 104 can include a thermal barrier coating. Multi-lobed film cooling holes 106 are oriented so that their inlets are positioned on the first wall surface 102 and their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104. Multiple multi-lobed film cooling holes 106 are positioned side-by-side in a row to form cooling hole array 107.

As described below in greater detail, cooling air flows out of cooling holes 106, with cooling air flowing through each of the lobes in the diffusing section. Cooling holes 106 of cooling hole array 107 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along second wall surface 104 (represented by arrow H). Here, the linear row of cooling holes 106 is substantially perpendicular to the direction of flow H to create array 107. In alternate embodiments, the orientation of cooling holes 106 can be arranged on second wall surface 104 so that the flow of cooling air is substantially perpendicular to the hot air flow (i.e. cooling air exits cooling holes 106 radially) or at an angle between parallel and perpendicular. Array 107 can also include staggered cooling holes 106 on wall 100. Cooling holes 106 can be located on a variety of components that require cooling. Suitable components include, but are not limited to, turbine vanes and blades, combustors, blade outer air seals, and augmentors, etc. Cooling holes 106 can be located on the pressure side or suction side of vanes and blades. Cooling holes 106 can also be located on the blade tip or blade or vane platforms.

Figure 4:
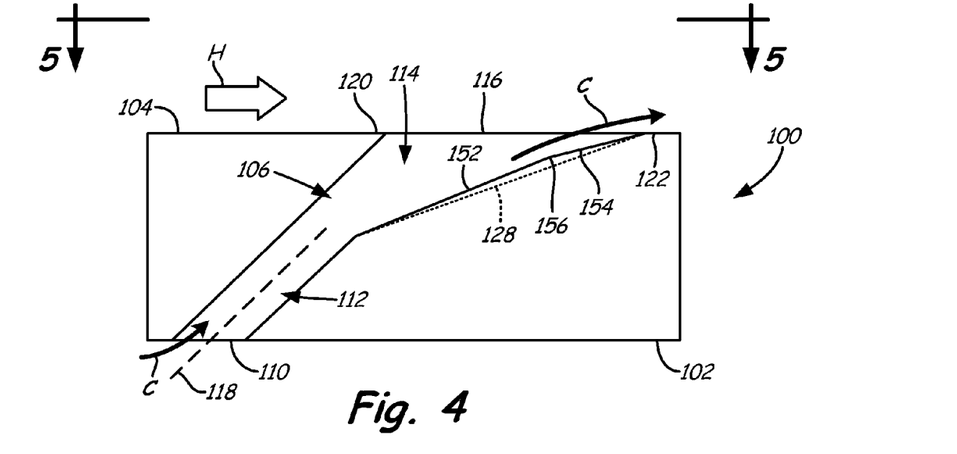
FIG. 4 is a sectional view of one of the multi-lobed cooling holes of FIG. 3 taken along the line 4-4.
Figure 5:
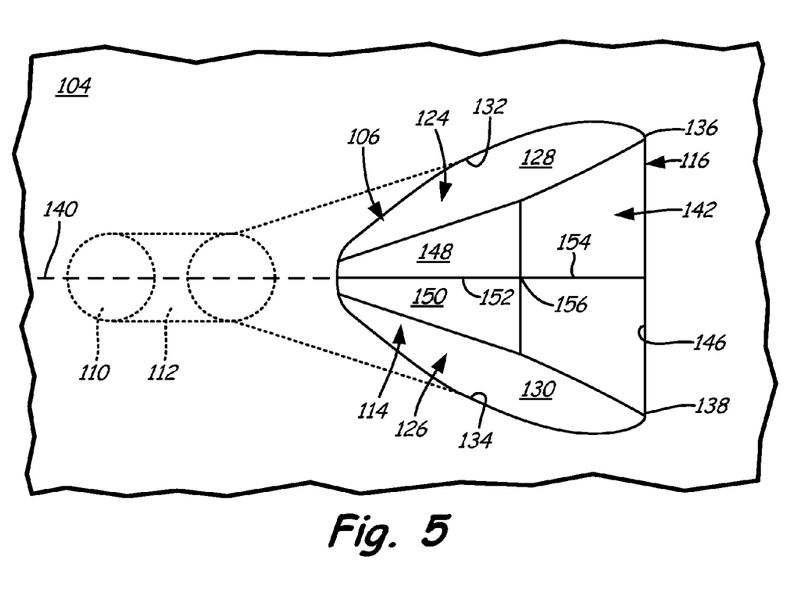
FIG. 5 is a view of the multi-lobed cooling hole of FIG. 4 taken along the line 5-5.

FIGS. 4 and 5 illustrate one embodiment of a single cooling hole 106 in greater detail. A single cooling hole is described below to illustrate the features present within cooling holes 106 of array 107. FIG. 4 illustrates a sectional view of multi-lobed film cooling hole 106 of FIG. 3 taken along the line 4-4. FIG. 5 illustrates a view of cooling hole 106 of FIG. 4 taken along the line 5-5. For the purposes of illustration, wall 100 has been removed from FIG. 5 to better show cooling hole 106. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of cooling air through cooling hole 106. In exemplary embodiments, metering section 112 has a substantially constant flow area from inlet 110 to diffusing section 114. Metering section 112 can have circular, oblong (oval or elliptical), racetrack (oval with two parallel sides having straight portions) crescent, cusp or dual-cusp shaped axial cross sections. In FIGS. 4 and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of 30d. In alternate embodiments, metering section 112 has an oblong or racetrack-shaped or other shaped cross section. As oblong and racetrack configurations are not circular, their metering sections 112 have a length l and hydraulic diameter $d_h$. In some embodiments, metering section 112 has a length l according to the relationship: $d_h \leq l \leq 3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118.

Diffusing section 114 is adjacent to and downstream from metering section 112. Cooling air C diffuses within diffusing section 114 before exiting cooling hole 106 along second wall surface 104. Second wall surface 104 includes upstream end 120 (upstream of cooling hole 106) and downstream end 122 (downstream from cooling hole 106). Diffusing section 114 opens along second wall surface 104 between upstream end 120 and downstream end 122. As shown in FIG. 4, cooling air C diffuses away from longitudinal axis 118 in diffusing section 114 as it flows towards outlet 116.

As shown best in FIG. 5, diffusing section 114 includes two channel-like lobes 124 and 126 as described in the U.S. Provisional Application No. 61/599,372, filed on Feb. 15, 2012 and entitled "MULTI-LOBED COOLING HOLE AND METHOD OF MANUFACTURE", which is incorporated by reference. Lobes 124 and 126 are surfaces of wall 100 which define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (the side walls are represented by lines 132 and 134, respectively) and a trailing edge (trailing edges 136 and 138, respectively). FIG. 4 best illustrates the longitudinal divergence (from longitudinal axis 118), while FIG. 5 best illustrates the lateral divergence (from centerline axis 140). As shown in FIG. 5, first lobe 124 laterally diverges upwards from centerline axis 140 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126.

Diffusing section 114 also includes interlobe region 142. Portion 144 of interlobe region 142 is located between first lobe 124 and second lobe 126. End 146 of interlobe region 142 is adjacent outlet 116 where the outlet meets second wall surface 104. Portion 144, located between first lobe 124 and second lobe 126, can extend towards metering section 112 to varying degrees. The location of end 146 of interlobe region 142 relative to trailing edges 136 and 138 can also vary. In the embodiment shown in FIG. 5, end 146 meets trailing edges 136 and 138 of lobes 124 and 126, respectively at outlet 116. In this embodiment, trailing edges 136 and 138 and hence, first lobe 124 and second lobe 126, extend to outlet 116 at second wall surface 104. In other embodiments, end 146 of interlobe region 142 is spaced from trailing edges 136 and 138. In these embodiments, trailing edges 136 and 138 and hence, first lobe 124 and second lobe 126, do not extend to outlet 116 at second wall surface 104.

In the embodiment illustrated in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards centerline axis 140 and second lobe 126. Second inclined portion 150 is located adjacent to and extends from bottom surface 130 of second lobe 126. Second inclined portion 150 extends from second lobe 126 towards centerline axis 140 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114.

In some embodiments, first inclined portion 148 and second inclined portion 150 meet together to form a ridge as shown in FIG. 5. Ridge 152 is located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106.

Ridge 152 can extend longitudinally to varying degrees between metering section 112 and interlobe region 142. Ridge 152 can extend upstream all the way to metering section 112, beginning where metering section 112 and diffusing section 114 meet as shown in FIG. 4. Alternatively, ridge 152 can begin farther downstream (closer to outlet 116). Ridge 152 can extend downstream to interlobe region 142 as shown in FIG. 4. Alternatively, ridge 152 can converge with bottom surfaces 128 and 130 upstream of interlobe region 142. Corresponding changes to the longitudinal lengths of first inclined portion 148 and second inclined portion 150 must accompany any change in the longitudinal extension of ridge 152. As shown in FIG. 4, ridge 152 does not extend to outlet 116.

Interlobe region 142 (and portions 144 and 145) can take various shapes and have different configurations depending on the location and desired flow profile of cooling hole 106. The bottom surface of interlobe region 142 can be flat or curved. A curved (longitudinally convex) bottom surface of interlobe region 142 can facilitate improved flow attachment due to the Coanda effect. Interlobe region 142 can have a compound trapezoidal shape as shown in FIG. 5. In some embodiments, ridge 154 separates interlobe region 142 into two sides having surfaces in two different planes. Ridge 154 converges with bottom surface 130 of second lobe 126 at outlet 116 at second wall surface 104 as shown in FIG. 4. The intersection of ridges 152 and 154 at the point where interlobe region 142 meets first inclined portion 148 and second inclined portion 150 forms apex 156. By forming apex 156 upstream of outlet 116, diffusing section 114 facilitates improved flow attachment.

In other embodiments, cooling hole 106 has diffusing section 114 with three channel-like lobes 124, 126 and 128 as described in the U.S. Provisional Application No. 61/599,381, filed on Feb. 15, 2012 and entitled "TRI-LOBED COOLING HOLE AND METHOD OF MANUFACTURE", which is incorporated by reference.

Figure 6:
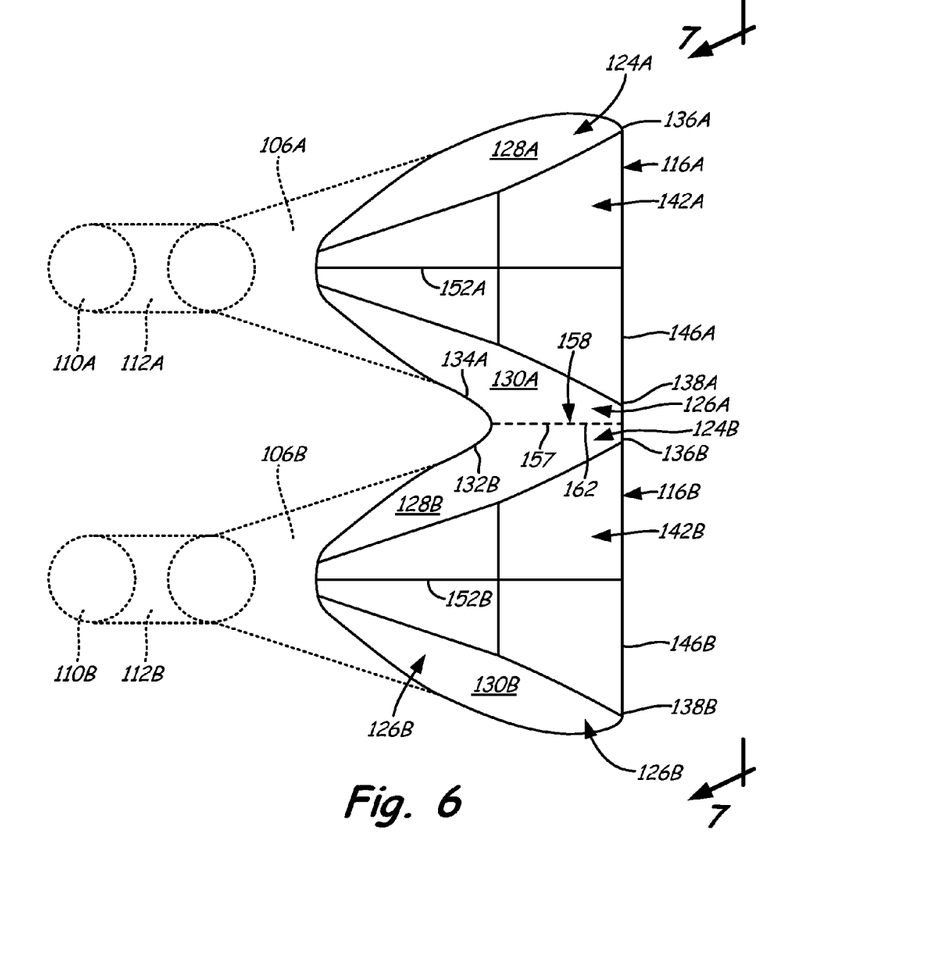
FIG. 6 is a view of two adjacent multi-lobed cooling holes of FIG. 3.
Figure 7:
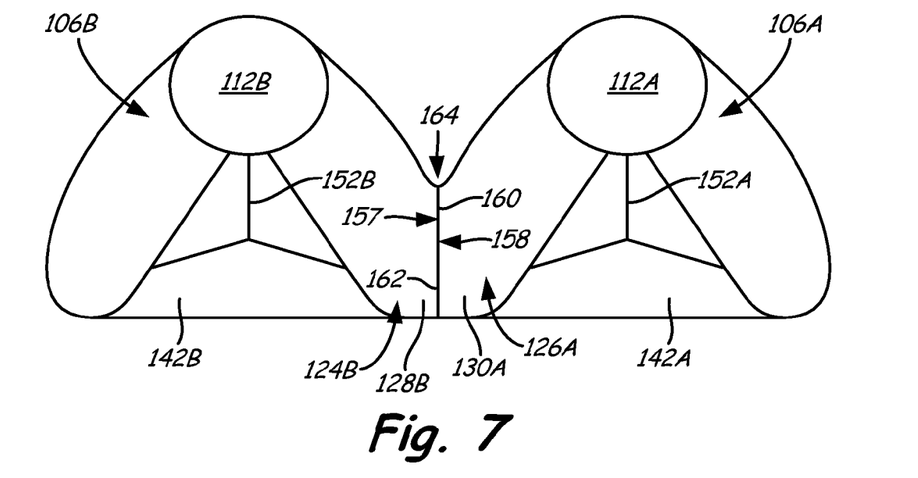
FIG. 7 is a sectional view of the multi-lobed cooling holes of FIG. 6 taken along the line 7-7.

FIGS. 6 and 7 illustrate two adjacent multi-lobed cooling holes 106. FIG. 6 shows a plan view of two multi-lobed cooling holes 106A and 106B. FIG. 7 is a sectional view of multi-lobed cooling holes 106A and 106B of FIG. 6 taken along the line 7-7. For the purposes of illustration, wall 100 has been removed from FIGS. 6 and 7 to better show cooling holes 106A and 106B. In some embodiments, cooling holes 106A and 106B have trailing edges that are substantially straight, or parallel or aligned with each other as shown in FIGS. 6 and 7. End 146A of cooling hole 106A and end 146B of cooling hole 106B are each located at second wall surface 104 at the same axial position (i.e. axially aligned). Ends 146A and 146B are also parallel. In alternative embodiments, ends 146A and 146B can be offset (i.e. staggered) or non-parallel (i.e. cooling air C from cooling holes 106A and 106B can laterally converge or diverge). In other embodiments, ends 146A and 146B can be curved instead of straight. Staggered and non-parallel arrangements of adjacent cooling holes 106 can allow individual cooling holes 106 to be oriented and aligned with high temperature gases passing over the cooling hole.

Cooling hole 106A abuts cooling hole 106B at outlets 116A and 116B. Cooling hole 106A and cooling hole 106B meet along ridge 157 upstream of outlets 116A and 116B (i.e. ridge 157 is located within the diffusing sections and not at the outlets). In some embodiments, ridge 157 is rounded or smoothed so that it does not create a feature having a sharp (acute) angle. Side wall 134A (first lateral end surface) of second lobe 126A of cooling hole 106A meets with side wall 132B (second lateral end surface) of first lobe 124B (third lobe) of cooling hole 106B at outlets 116A and 116B upstream of the trailing edge (ends 146A and 146B) as shown in FIG. 6. By locating adjacent cooling holes 106A and 106B so that their lateral end surfaces meet at outlets 116A and 116B upstream of the trailing edge, a continuous and uninterrupted film of cooling air C is formed along second wall surface 104 spanning both cooling hole 106A and cooling hole 106B.

In some embodiments, cooling hole 106A and cooling hole 106B meet to form cusp 158 (shown best in FIG. 7). Lobe 126A forms one side of cusp 158, while lobe 124B forms the other side of cusp 158. Cusp 158 includes upstream end 160 and downstream end 162. In some embodiments, cusp 158 does not extend all the way downstream to outlet 116A or outlet 116B as shown in FIG. 6 by the dashed line. Locating the ends of cusp 158 and/or common wall 157 upstream of outlets 116A and 116B creates a continuous trailing edge (146A and 146B) along both cooling holes as shown in FIG. 6. Creating a continuous trailing edge reduces the potential for thermo-mechanical fatigue effects on cooling holes 106A and 106B. In some embodiments, cusp 158 is rounded or smoothed so that it does not create a feature having a sharp angle. A continuous trailing edge can also be easier to manufacture by casting and/or masking methods. In some embodiments, at least a portion of diffusing sections 114A and 114B are formed by casting and/or masking.

To further reduce the likelihood of thermo-mechanical fatigue, regions near upstream end 160 of cusp 158 can be smoothed to eliminate sharp corners and edges at outlets 116A and 116B. As shown in FIG. 7, region 164 near upstream end 160 is rounded to prevent sharp corners or points along cusp 158 and the areas between outlets 116A and 116B.

FIGS. 6 and 7 illustrate two cooling holes (106A and 106B) with each cooling hole having two lobes 128 and 130. In other embodiments, adjacent cooling holes 106 can both have three lobes. In still other embodiments, adjacent cooling holes 106 can include one cooling hole having two lobes and the other cooling hole having three lobes. Cooling holes having multiple diffusing sections can also be placed in array 107. Cooling holes with multiple diffusing sections are described in U.S. Provisional Application No. 61/599,384, filed on Feb. 15, 2012 and entitled "MULTIPLE DIFFUSING COOLING HOLE", which is incorporated by reference.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a wall having first and second wall surfaces and first and second cooling holes extending through the wall. The first and second cooling holes can each include an inlet located at the first wall surface, an outlet located at the second wall surface, a metering section extending downstream from the inlet and a diffusing section extending from the metering section to the outlet. Each diffusing section can include first and second lobes, each lobe diverging longitudinally and laterally from the metering section. The outlets of each cooling hole can include first and second lateral ends and a trailing edge. One of the lateral ends of the outlet of the first cooling hole and one of the lateral ends of the outlet of the second cooling hole can meet upstream of the trailing edge of the first cooling hole and the trailing edge of the second cooling hole.

The system of the preceding paragraph can optionally include, additionally and/or alternatively any, one or more of the following features, configurations and/or additional components:

the second lateral end of the first outlet and the first lateral end of the second outlet can form a cusp;

the cusp formed by the first lateral end of the first outlet and the second lateral end of the second outlet can include an upstream end and a downstream end;

the cusp can be located upstream of the first outlet and the second outlet;

a region near where the lateral end of the first cooling hole and the lateral end of the second cooling hole meet can be smoothed to eliminate sharp corners;

at least one of the diffusing sections of the first and second cooling holes can further include a first interlobe region having a portion that extends between the first and second lobes of the at least one diffusing section, the first interlobe region having an end adjacent the second wall surface;

the diffusing section of the first cooling hole can further include a third lobe positioned between the first and second lobes, the third lobe diverging longitudinally from the metering section of the first cooling hole; and/or the diffusing section of the second cooling hole can further include a third lobe positioned between the first and second lobes, the third lobe diverging longitudinally from the metering section of the second cooling hole.

A wall of a component of a gas turbine engine can include first and second wall surfaces, first and second inlets located at the first wall surface, and first and second outlets located at the second wall surface. A first metering section can commence at the first inlet and extend downstream from the first inlet. A first diffusing section can extend from the first metering section and terminate at the first outlet. The first diffusing section can include a first trailing edge and first and second lobes, each lobe diverging longitudinally and laterally from the first metering section. The second lobe can include a first lateral end surface. A second metering section can commence at the second inlet and extend downstream from the second inlet. A second diffusing section can extend from the second metering section and terminate at the second outlet. The second diffusing section can include a second trailing edge and third and fourth lobes, each lobe diverging longitudinally and laterally from the second metering section. The third lobe can include a second lateral end surface. The first lateral end surface of the second lobe and the second lateral end surface of the third lobe can meet upstream of the first and second trailing edges.

The system of the preceding paragraph can optionally include, additionally and/or alternatively any, one or more of the following features, configurations and/or additional components:

the first lateral end surface of the second lobe and the second lateral end surface of the third lobe can form a cusp;

the cusp formed by the first lateral end surface of the second lobe and the second lateral end surface of the third lobe can include an upstream end and a downstream end;

the cusp can be located upstream of the first and second outlets;

a region near where the first lateral end surface and the second lateral end surface meet can be smoothed to eliminate sharp corners;

the first diffusing section can further include a first interlobe region having a portion that extends between the first and second lobes, the first interlobe region having an end adjacent the first outlet; and the second diffusing section can further include a second interlobe region having a portion that extends between the third and fourth lobes, the second interlobe region having an end adjacent the second outlet;

the first trailing edge and the second trailing edge can be parallel and radially aligned;

the first diffusing section can further include a fifth lobe positioned between the first and second lobes, the fifth lobe diverging longitudinally from the first metering section; and/or the second diffusing section can further include a sixth lobe positioned between the third and fourth lobes, the sixth lobe diverging longitudinally from the second metering section.

A method for producing an array of multi-lobed cooling holes between first and second wall surfaces can include forming a first cooling hole and a second cooling hole. The first cooling hole can include an inlet located at the first wall surface, an outlet located at the second wall surface, a metering section commencing at the inlet and extending downstream from the inlet and a diffusing section extending from the metering section and terminating at the outlet. The diffusing section can include first and second lobes, each lobe diverging longitudinally and laterally from the metering section, and a trailing edge. The second cooling hole can include an inlet located at the first wall surface, an outlet located at the second wall surface, a metering section commencing at the inlet and extending downstream from the inlet and a diffusing section extending from the metering section and terminating at the outlet. The diffusing section can include first and second lobes, each lobe diverging longitudinally and laterally from the metering section, and a trailing edge. The second lobe of the first cooling hole and the first lobe of the second cooling hole can meet upstream of the outlets of the first and second cooling holes.

The system of the preceding paragraph can optionally include, additionally and/or alternatively any, one or more of the following features, configurations and/or additional components:

at least a portion of the diffusing sections of the first and second cooling holes can be formed by casting; and/or at least a portion of the diffusing sections of the first and second cooling holes can be formed by masking.

The invention claimed is:

1. A gas turbine engine component comprising:
a wall of the gas turbine engine component having first and second wall surfaces;
a first cooling hole extending through the wall and comprising:
an inlet located at the first wall surface;
an outlet located at the second wall surface and comprising:
first and second lateral ends; and
a trailing edge;
a metering section extending downstream from the inlet; and
a diffusing section extending from the metering section to the outlet, the diffusing section comprising:
first and second lobes, each lobe diverging longitudinally and laterally from the metering section; and
a second cooling hole extending through the wall and comprising:
an inlet located at the first wall surface;
an outlet located at the second wall surface and comprising:
first and second lateral ends; and
a trailing edge;
a metering section extending downstream from the inlet; and
a diffusing section extending from the metering section to the outlet, the diffusing section comprising:
first and second lobes, each lobe diverging longitudinally and laterally from the metering section,
wherein one of the lateral ends of the outlet of the first cooling hole and one of the lateral ends of the outlet of the second cooling hole meet upstream of the trailing edge of the first cooling hole and the trailing edge of the second cooling hole.

2. The component of claim 1, wherein the second lateral end of the first outlet and the first lateral end of the second outlet form a cusp.

3. The component of claim 2, wherein the cusp formed by the first lateral end of the first outlet and the second lateral end of the second outlet comprises an upstream end and a downstream end.

4. The component of claim 3, wherein the cusp is located upstream of the first outlet and the second outlet.

5. The component of claim 1, wherein a region near where the lateral end of the first cooling hole and the lateral end of the second cooling hole meet is smoothed to eliminate sharp corners.

6. The component of claim 1, wherein at least one of the diffusing sections of the first and second cooling holes further comprises an interlobe region having a portion that extends between the first and second lobes of the at least one diffusing section, the interlobe region having an end adjacent the second wall surface.

7. The component of claim 1, wherein the trailing edge of the first cooling hole and the trailing edge of the second cooling hole are parallel and radially aligned.

8. The component of claim 1, wherein the diffusing section of the first cooling hole further comprises a third lobe positioned between the first and second lobes, the third lobe diverging longitudinally from the metering section of the first cooling hole.

9. The component of claim 8, wherein the diffusing section of the second cooling hole further comprises a third lobe positioned between the first and second lobes, the third lobe diverging longitudinally from the metering section of the second cooling hole.

10. A wall of a component of a gas turbine engine, the wall comprising:
first and second wall surfaces;
a first inlet located at the first wall surface;
a first outlet located at the second wall surface;
a first metering section commencing at the first inlet and extending downstream from the first inlet;
a first diffusing section extending from the first metering section and terminating at the first outlet, the first diffusing section comprising:
first and second lobes, each lobe diverging longitudinally and laterally from the first metering section, wherein the second lobe comprises a first lateral end surface; and
a first trailing edge;
a second inlet located at the first wall surface;
a second outlet located at the second wall surface;
a second metering section commencing at the second inlet and extending downstream from the second inlet;
a second diffusing section extending from the second metering section and terminating at the second outlet, the second diffusing section comprising:
third and fourth lobes, each lobe diverging longitudinally and laterally from the second metering section, wherein the third lobe comprises a second lateral end surface; and
a second trailing edge;
wherein the first lateral end surface of the second lobe and the second lateral end surface of the third lobe meet upstream of the first and second trailing edges.

11. The wall of claim 10, wherein the first lateral end surface of the second lobe and the second lateral end surface of the third lobe form a cusp.

12. The wall of claim 11, wherein the cusp formed by the first lateral end surface of the second lobe and the second lateral end surface of the third lobe comprises an upstream end and a downstream end.

13. The wall of claim 12, wherein the cusp is located upstream of the first and second outlets.

14. The wall of claim 10, wherein a region near where the first lateral end surface and the second lateral end surface meet is smoothed to eliminate sharp corners.

15. The wall of claim 10, wherein the first diffusing section further comprises a first interlobe region having a portion that extends between the first and second lobes, the first interlobe region having an end adjacent the first outlet, and wherein the second diffusing section further comprises a second interlobe region having a portion that extends between the third and fourth lobes, the second interlobe region having an end adjacent the second outlet.

16. The wall of claim 10, wherein the first diffusing section further comprises a fifth lobe positioned between the first and second lobes, the fifth lobe diverging longitudinally from the first metering section.

17. The wall of claim 16, wherein the second diffusing section further comprises a sixth lobe positioned between the third and fourth lobes, the sixth lobe diverging longitudinally from the second metering section.

18. A method for producing an array of multi-lobed cooling holes between first and second wall surfaces of a gas turbine engine component, the method comprising:
    forming a first cooling hole, wherein the first cooling hole comprises:
        an inlet located at the first wall surface;
        an outlet located at the second wall surface;
        a metering section commencing at the inlet and extending downstream from the inlet;
        a diffusing section extending from the metering section and terminating at the outlet, the diffusing section comprising:
            first and second lobes, each lobe diverging longitudinally and laterally from the metering section; and
            a trailing edge; and
    forming a second cooling hole, wherein the second cooling hole comprises:
        an inlet located at the first wall surface;
        an outlet located at the second wall surface;
        a metering section commencing at the inlet and extending downstream from the inlet;
        a diffusing section extending from the metering section and terminating at the outlet, the diffusing section comprising:
            first and second lobes, each lobe diverging longitudinally and laterally from the metering section; and
            a trailing edge,
    wherein the second lobe of the first cooling hole and the first lobe of the second cooling hole meet upstream of the outlets of the first and second cooling holes.

19. The method of claim 18, wherein at least a portion of the diffusing sections of the first and second cooling holes are formed by casting.

20. The method of claim 18, wherein at least a portion of the diffusing sections of the first and second cooling holes are formed by masking.

* * * * *